Figure 1:
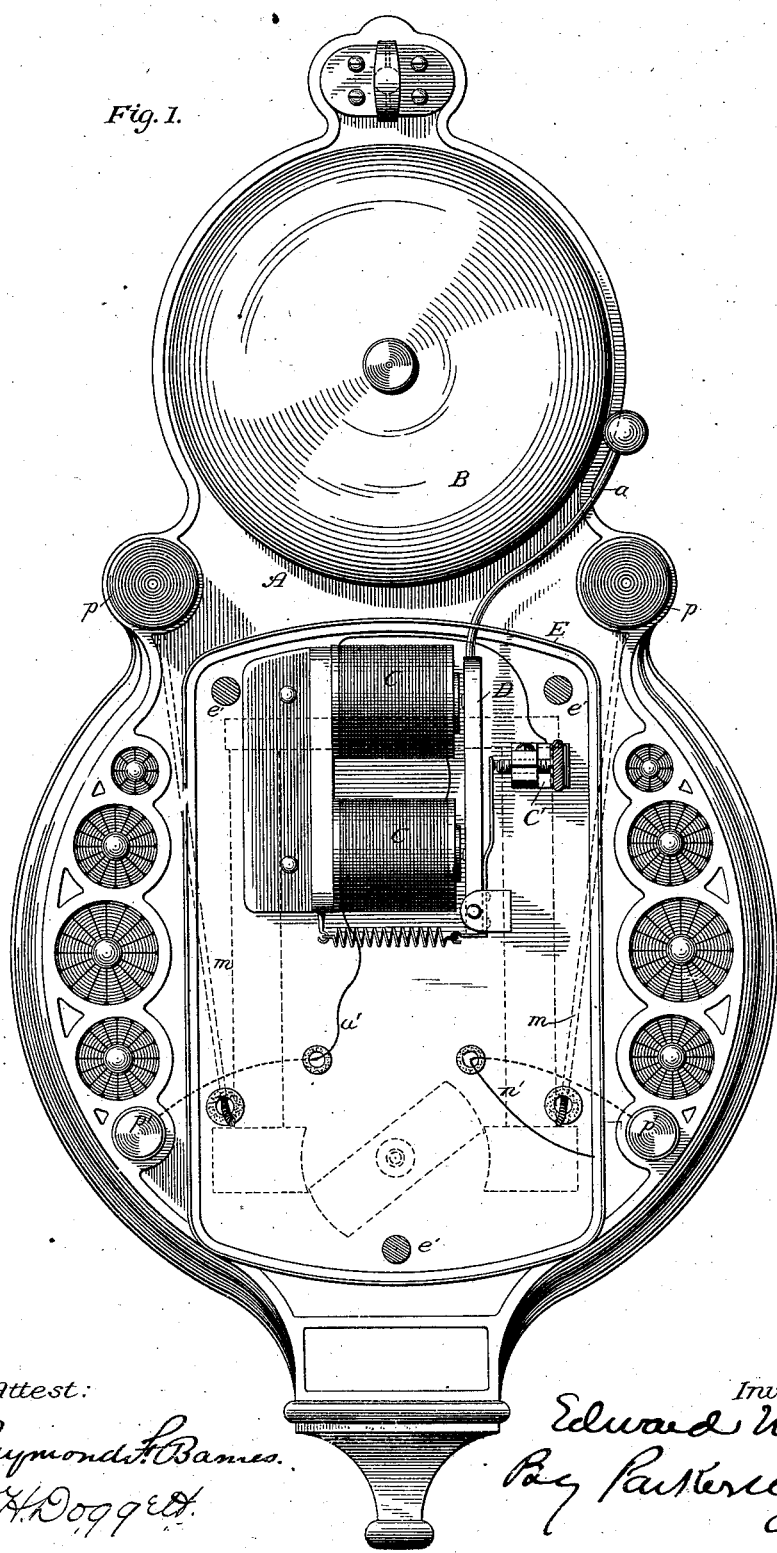

(No Model.) 2 Sheets—Sheet 1.

E. WESTON.
ELECTRICAL INDICATOR.

No. 292,714. Patented Jan. 29, 1884.

Attest:
Raymond F. Barnes.
W. H. Doggett.

Inventor:
Edward Weston
By Parkern Page
atty.

(No Model.) 2 Sheets—Sheet 2.
E. WESTON.
ELECTRICAL INDICATOR.
No. 292,714. Patented Jan. 29, 1884.
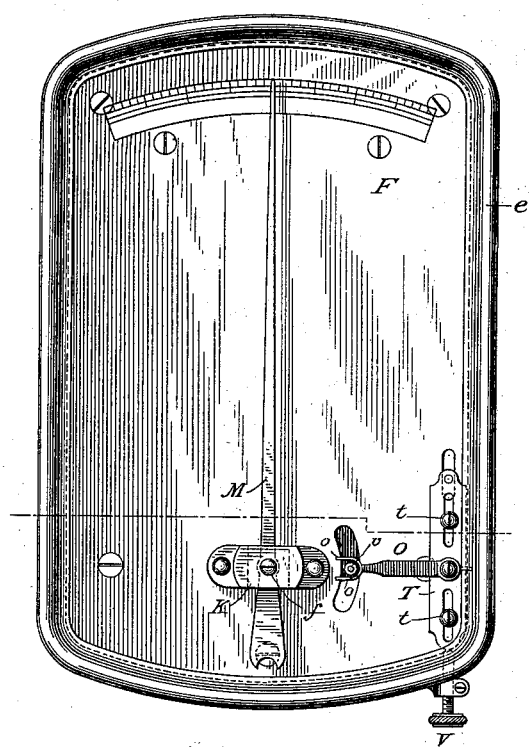
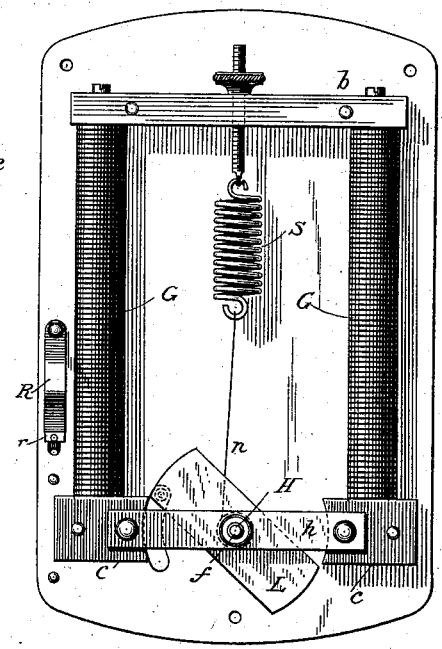
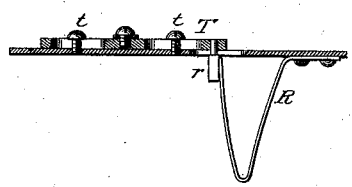
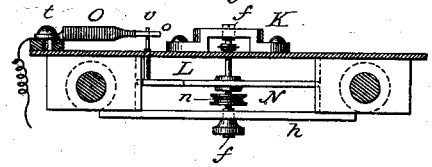
Attest:
Raymond F. Barnes.
W. H. Doggett.
Inventor:
Edward Weston
By Parker W. Page
Atty.

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

ELECTRICAL INDICATOR.

SPECIFICATION forming part of Letters Patent No. 292,714, dated January 29, 1884.

Application filed September 12, 1883. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Electrical Indicators, of which the following is a specification, reference being had to the drawings accompanying and forming a part of the same.

In a United States patent numbered 266,244 I have shown and described an indicator for electric circuits, the principal feature of which is the presence of mechanisms for indicating the amount of current flowing in the circuit with which the apparatus is used, and also for giving intimation of the occurrence of any fluctuations of current strength, as by operating an alarm-bell without interfering with the operation of the indicating mechanism or affecting its accuracy. The purpose for which such apparatus is mainly designed is to indicate at some part of a circuit, usually at the generating-station, the electrical condition of the line. For instance, on a circuit containing a certain number of arc-lamps of a given character, it is desirable to supply for their best working conditions eighteen amperes of current. Varying this amount disturbs the even working of the lamps. An indicator such as referred to is therefore included in the circuit, and so adjusted as to sound the alarm upon any variation in the amount of current flowing above or below the normal limit, so that the attention of the attendant is not only directed to the fact that a change has occurred, but an indication of the extent of such change is at the same time afforded.

The subject of my present application is an apparatus of improved construction for accomplishing these results, the improvements relating to both the indicating and alarm mechanism and to certain details in the construction of the same, by means of which the apparatus is rendered more accurate in its action and more easy of adjustment and manipulation.

In describing my invention, reference is made to the accompanying drawings, where Figure 1 is a face view of the apparatus with the indicating-dial and cover removed. Fig. 2 is a view of the dial and the parts connected therewith. Fig. 3 is a rear view of the dial-plate, showing the indicating mechanism. Fig. 4 is a sectional view of a portion of the dial-plate and certain parts carried thereby, and Fig. 5 is a broken section on line $x\ x$ of Fig. 2.

Similar letters of reference indicate corresponding parts.

The letter A designates a base-plate, generally of metal, and provided with suitable means for attaching it to a convenient support.

On the upper portion of plate A is fixed an alarm-bell, B, below which are the magnets C and the vibrating armature D, carrying the striking-arm $a$.

Fixed to the plate A is a box or casing, E, that surrounds the magnets C, and is designed to inclose all the operative portions of the indicating mechanism.

F is a metal plate that is secured within the casing E just below the flanged rim $e$ of the same. (Shown in Fig. 2.) On the face of plate F is a graduated scale, the divisions of which are practically equal. To the rear side of the plate F are attached two bar-magnets, G G, joined above by a cross-piece, $b$, and provided with pole-pieces $c\ c$, having curved faces. Between the poles is journaled a light spindle, H, by means of pivoting-screws $f\ f$, set in a non-magnetic bar, $h$, spanning the two poles, and in a raised arm or bracket, K, on the face of the dial-plate F. The spindle H passes through the plate F.

L is an armature composed of a comparatively thin plate of soft iron, with rounded ends that approach very closely the curved faces of the poles C C.

M is a light pointer, fixed to the spindle H between the face of the dial-plate and the pivotal support in the bracket K. This pointer sweeps over the scale at the upper end of the plate. On the spindle H is also fixed a grooved wheel, N, around which passes a cord or wire, $n$, connected to the end of a spiral or other spring, S, connected by an adjusting-screw to a fixed portion of the apparatus, by preference to the cross-bar $b$.

Conductors $m\ m$ lead from binding-posts $p$ $p$ on the base A, and connect with the coils of the magnets G G.

To use the instrument as an indicator or ammeter, it is connected up in the circuit by bringing the line-wires to the binding-posts $p$ $p$. The tension of the spring S tends to revolve the spindle H and throw the armature L out of line with the pole-pieces. The presence of a current in the coils of the magnets G G energizes the magnets and draws the armature against the tension of the spring, shifting at the same time the pointer M over the scale, and giving in this way an indication of the amount of current flowing. In the present form of instrument the deflections of the pointer will be practically proportionate to the variations in the current, this being the result of the peculiar construction of the parts described.

It will be observed that the mass of iron in the armature L is very small as compared with that of the magnets G G and poles C C, that the magnets are long in proportion, and that the poles are widely separated. By this construction the reactive influence of the armature on the magnets is very greatly reduced, so that a given increase in the strength of the magnets effects a nearly proportionate displacement of the armature; but in order that the retractile force of the spring may remain as nearly as possible uniform, which would not be the case were the spring S connected directly to the armature, as is usually done, I apply the retractile force tangentially to the spindle by means of the pulley and cord. By this means the leverage remains the same for all positions of the spindle and armature, and a more correct indication of variations in current strength afforded.

To make the instrument available as an alarm and indicator to show variations from the normal current strength in an electric circuit, I use the following devices: On the dial-plate F is held, by means of screws $t\,t$, a slotted plate or bar, T. An adjusting-screw, V, bears against the lower end of the plate, and a spring, R, on the under side of plate F, presses against a pin, $r$, that projects from the plate T through a slot in plate F. By means of the spring R and screw V the plate T is adjusted and held in the desired position. A flexible arm, O, consisting, by preference, of a coiled spring, is fastened to the plate T, and provided at its end with prongs $o$. Between these projects a pin, $v$, set in the armature L, and extending through a curved slot in the plate F. The circuit-connections with these parts are made in such a way that when the pin $v$ comes in contact with one of the prongs of the arm O, the circuit through the bell-magnet will be completed and the armature D set in vibration. To effect this I employ a local-battery circuit for the bell-magnets, said circuit being made by bringing the battery-wires to binding-posts $p'\,p'$. A conductor, $a'$, leads from one of these posts to and around the magnets C, and then to the back contact-stop C′, which is insulated from the metal frame. From this point the circuit is through the armature D to the metal frame and the armature L. The dial-plate F is insulated also from the metal base A, it being for this purpose held in place by screws, which enter the ends of insulated posts $e'\,e'\,e'$. A wire, $n'$, leads from the plate T to the other binding-post $p'$. When the pin $v$ therefore comes in contact with the arm O, the local circuit is completed and the bell sounded, though from the flexible nature of the arm O the movement of the armature is so little retarded that the correct indication of the current is not interfered with.

In using the instrument for a given current, the arm O is adjusted so that it will be out of contact with the pin $v$ while a normal current is flowing. Any variation from this current will then be at once signaled and its extent accurately indicated.

Though specially applicable to the purposes described, the apparatus may be used, generally, as an ammeter, it being only necessary to standardize it by some current of known quantity.

The details of construction in some particulars and the arrangement of circuits may be obviously varied to a considerable extent without departing from the invention.

What I claim, however, without relinquishing the right to make subject of other applications features of novelty which are herein shown or described but not claimed, is—

1. In an apparatus of the kind described, the combination, with magnets having pole-pieces with curved faces, of an armature consisting of a magnetic plate mounted to turn between the poles, a retractile spring, and a pointer or index arm, all substantially as set forth.

2. The combination, with the magnet having long parallel cores and pole-pieces with curved faces, of an armature mounted to turn between the pole-pieces, and consisting of a thin magnetic plate with rounded ends, a retractile spring, and an index-arm.

3. The combination, with the magnet having parallel cores and pole-pieces with curved faces, of an armature mounted to turn between said poles, a retractile spring, a flexible contact-arm in the path of the armature, and an alarm-circuit adapted to be closed by the contact of the armature and the flexible arm, all as set forth.

4. The combination, with opposing magnetic poles, of an armature mounted on a spindle or axis between the same in a manner to be drawn into line with the poles by the attraction of the magnet, and a retractile spring and a cord passing around the spindle and connected to the spring, whereby the retractile force of the spring is applied tangentially to the axis of the armature, as specified.

5. The combination, with the movable armature of a current-indicator, of an adjustable plate or bar, a flexible contact-arm attached thereto and extending into the path of the armature or a projection therefrom, an electric alarm, and circuit-connections, substantially as described.

6. The combination of the base A, the raised and insulated plate F, the magnets and movable armature secured to the back of said plate, the pin $v$, carried by the armature, the adjustable and flexible contact-arm O, secured to the face of the plate, and alarm mechanism arranged to be brought into operation by the contact of the pin $v$ and arm O, as set forth.

7. The combination of the magnets G G, having poles with curved faces, the armature L, spindle H, pointer M, and retractile spring S, connected to the spindle by a cord running over a grooved wheel, N, all as set forth.

8. The combination, with the dial-plate, the magnets G G, and armature L, having a pin or part, $v$, projecting through a slot in the plate, of the adjustable plate or bar T, arm O, formed of a spiral spring, and provided with prongs $o$ in the path of the pin $v$, and alarm mechanism adapted to be brought into operation by the contact of the arm and pin, as and for the purpose set forth.

In testimony whereof I have hereunto set my hand this 7th day of September, 1883.

EDWARD WESTON.

Witnesses:
   PARKER W. PAGE,
   W. FRISBY.